United States Patent [19]

Nakamura et al.

[11] 4,328,055
[45] May 4, 1982

[54] GUT

[75] Inventors: Masaaki Nakamura; Hisaaki Ueba, both of Mibu, Japan

[73] Assignees: Kureha Kagaku Kogyo Kabushiki Kaisha, Tokyo; Kureha Gosen Kabushiki Kaisha, Tochigi, both of Japan

[21] Appl. No.: 113,451

[22] Filed: Jan. 21, 1980

Related U.S. Application Data

[62] Division of Ser. No. 57,816, Jul. 16, 1979, Pat. No. 4,300,343.

[30] Foreign Application Priority Data

Jul. 27, 1978 [JP] Japan ................................. 53-90964

[51] Int. Cl.³ .............................................. D04H 3/16
[52] U.S. Cl. .................................... 156/167; 156/180; 264/103; 264/177 F
[58] Field of Search .................. 264/103, 210.8, 177 F, 264/DIG. 75; 156/167, 180

[56] References Cited

U.S. PATENT DOCUMENTS

| | | | |
|---|---|---|---|
| 1,389,517 | 8/1921 | Kitsee | 264/103 |
| 2,336,743 | 12/1943 | Manning | 264/DIG. 75 |
| 2,545,869 | 3/1951 | Bailey | 264/103 |
| 2,770,835 | 11/1956 | Williams | 264/103 |
| 3,250,602 | 5/1966 | Stalego | 264/103 |
| 3,522,341 | 7/1970 | Coplan et al. | 264/178 Z |
| 3,558,757 | 1/1971 | Denyes et al. | 264/103 |
| 3,628,931 | 12/1971 | Russell | 425/382.2 |
| 3,777,470 | 12/1973 | Suzuki et al. | 264/103 |
| 3,840,630 | 10/1974 | Yamada et al. | 264/103 |
| 3,844,097 | 10/1974 | Bobkowicz et al. | 264/103 |
| 4,019,311 | 4/1977 | Schippers | 264/103 |
| 4,055,941 | 4/1977 | Rivers et al. | 57/251 |
| 4,176,211 | 11/1979 | Jackson | 264/177 F |

FOREIGN PATENT DOCUMENTS

| | | | |
|---|---|---|---|
| 634623 | 1/1962 | Canada | 264/103 |
| 52-10356 | 1/1977 | Japan | 264/103 |
| 1335607 | 10/1973 | United Kingdom | 264/103 |

Primary Examiner—Jay H. Woo
Attorney, Agent, or Firm—Wegner & Bretschneider

[57] ABSTRACT

A gut having a novel structure made of a thermoplastic resin and a method of producing the same.

6 Claims, 5 Drawing Figures

GUT

This is a Division of application Ser. No. 57,816 filed July 16, 1979 now U.S. Pat. No. 4,300,343.

BACKGROUND AND DETAILED DESCRIPTION OF THE INVENTION

The present invention relates to a gut having a novel structure, and more particularly to a suitable gut for tennis rackets and badminton rackets or for strings of stringed musical instruments.

As to the prior arts, many kinds of guts made of thermoplastic resins have been proposed such as: those monofilaments having numerous spiral jogs on the surface of gut itself; those made of twisted monofilaments adhering mutually by thermoplastic rubber materials; and those made of twisted multi-filaments adhering mutually by thermal adhesion of thermoplastic material of the multi-filament at a stretched state.

However, the gut made of a monofilament of a synthetic resin has a disadvantage of becoming slack in use for a long period, and on the other hand, the gut comprising the above-mentioned monofilaments are not satisafactory in their durability and resistance to wear and they are expensive according to the production through complicate processes. As a more important problem, it is required that in the case where the gut is used for rackets for tennis or badminton, the gut has an excellent creep characteristic, so as not to become slack after use for a long period, high durability, waterproofness, and resistance to wear, and has a special very delicate material characteristic of having an appropriate friction on their surface, of giving a fine sound, a repulsion to the ball and a shock on the hand of the player.

However, in the prior art, such a gut fully satisfying these delicate material characteristics has not been proposed. The above-mentioned problems and other problems have been first solved effectively by the gut of the present invention summarized as follows.

A gut prepared by collectively twisting a plurality of monofilaments of thermoplastic resin(s) spinned from nozzles while maintaining said plurality of monofilaments at a temperature at least higher than the softening point of said resin(s).

In the more preferable case of the concrete Example of the present invention, the gut for rackets of tennis and badminton or for stringed musical instruments consists of a bundle of bristles prepared by twisting a bundle of thermoplastic resin filaments at a twist number of T of 3-100/m and having them mutually adhered while heating and superficially melting them, stretching after cooling, and heat-treating. The elongation at break of the gut is 10 to 40%.

At the time of the above-mentioned twisting, it is preferable to have the surface of each monofilament in a melt state and have the other sectional part of each monofilament in a semi-melt state. For that purpose, the filaments before assembling may be heated from outside. On twisting the bundle of the monofilaments in the above-mentioned state, the monofilaments mutually melt-adhered by both the heat which generates at assembling and their own latent heat to form a center part with a higher density and on the other hand, since the peripheral part of the bundle of monofilaments and the monofilaments present in the outermost periphery of the bundle are most easily able to radiate their heat, in other words, their heat is not so much maintained as the heat of filaments present in the center part of the bundle, the filaments in the peripheral part of the bundle mutually adhere while maintaining their own shape of monofilament.

Accordingly, the gut thus obtained has a novel structure consisting of the central strong nuclear part and the spiral peripheral part based on the monofilaments.

The gut of the present invention has the following advantages according to the above-mentioned novel structure and the continued steps of preparation of melt spinning, collective twisting, cooling, stretching, and heat-treating in that order.

That is, since the filaments are adhered mutually without using any adhesives the gut of the present invention has a good durability and resistance to wear, and since the gut of the present invention has in its periphery a spiral structure of monofilaments, it has an appropriate friction, and since the gut maintains a monofilamentous structure to a certain extent it is excellent in the creep characteristic. In addition, since the process of preparing the gut is not so complicated as in conventional guts comprising multifilament, the cost reduction is possible and its quality control is far easier than the conventional gut comprising multifilament. Moreover, by utilizing a polyvinylidene fluoride resin as the raw material it is possible to obtain gut excellent in mechanical strength and in weatherproofness.

The production of the gut made of thermoplastic resin filaments of the present invention is more particularly explained in the following referring to an Example and the above-mentioned FIGURES.

EXAMPLE

Figure 1:
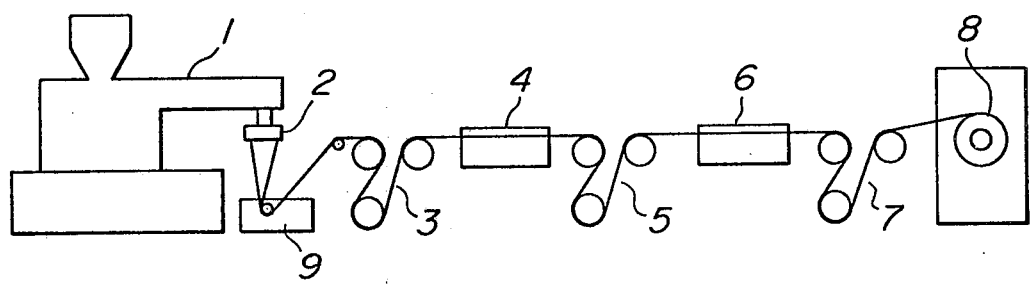
FIG. 1 shows a schematic diagram of an apparatus for preparing the gut of the present invention.
Figure 3:
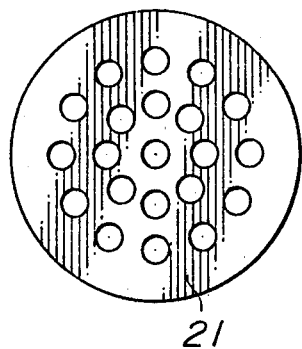
FIG. 3 shows the plan view of the spinning nozzle.
Figure 2:
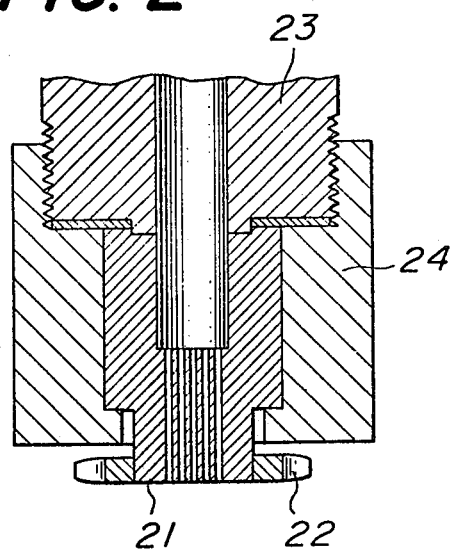
FIG. 2 shows the cross sectional view of the spinning nozzle of an extruder, from which the monofilaments are extruded.

The raw material, a polyvinylidene fluoride resin, charged into an extruder 1, was extruded via a spinning nozzle 21 installed in the die part 2. The spinning nozzle 21 is maintained by holder 24 rotatable against an adapter 23 and further a sprocket 22 has been put into the holder 24. As is shown in FIG. 3, a plurality of circular holes are provided in the spinning nozzle 21. Since the spinning nozzle 21 is rotated by a chain not shown in FIGS. via the sprocket 22, the extruded and not-yet stretched monofilaments from the nozzle 21 in a melt state were collectively twisted. The twisting step is carried out at a temperature of 140°–300° C., preferably 150°–200° C. There is a quench bath 9 at a position directly under the nozzle 21 and a distance of several tens of centimeter. The assembled not-yet stretched filaments were quenched and solidified, and after passing through the apparatuses for stretching and heat-treatment shown in FIG. 1 they were transformed to be the gut of polyvinylidene fluoride suitable for the gut of the present invention.

In addition, 3, 5, and 7 are godet rollers; 4 is a stretching bath; and 8 is winding roll.

Furthermore, the twisting carried out under the nozzle 21 may be effected by rotating only the nozzle 21 or by rotating the whole apparatus of extruding.

It is most suitable that the diameter of the monofilament is 50 to 400 micron from the view point of tensile strength and durability of the gut, and the number of the monofilaments is 5 to 100, preferably 20 to 60.

It is usual to have circular holes in the spinning nozzle 23, however, by providing star-shaped or cogwheel-shaped holes in the peripheral part of the nozzle it is possible to have minute filaments around the monofilament. By adding such minute filaments to the spiral-formed coarse monofilaments a more preferable gut is obtainable. Since in the present invention, the not-yet stretched filaments in a melt state are twisted to adhere mutually and then the twisted bundle is cooled to solidify and the solidified bundle is continuously stretched and thermally treated, the gut made of a thermoplastic resin having the most suitable properties as the gut is easily obtainable. No solidifying agent is necessary for collectively adhering, and the deterioration of the surface of the gut, which occurs when a solidifying agent is used in thermally adhereing the filaments does not occur in the present invention. Moreover, the preparing of the gut of the present invention is carried out in a continuous process and so the product of uniform quality is obtained at a cheaper cost in a large amount. This is an advantage of the present invention.

The gut of the present invention has been twisted for the gut of rackets used in tennis and badminton because of the necessity of improved ballcatching ability and for preventing the slip of the ball when the ball contacts to the gut as well as for preventing the slack of the gut itself. Both too strong twisting and too weak twisting are not suitable, that is, at the twist number of smaller than 3 T/m (the unit is the number of twist per meter), slip of the gut is apt to occur at the cross point of the guts resulting a poor ball-catching effect and slips of the ball. On the other hand, at the twist number of larger than 100 T/m, there is a possibility of causing naps on the surface of the gut during the frequent use due to the excessive friction of the surface of the gut. In cases where the number of twisting is in the range of 3 to 100 T/m, more preferably 10 to 50 T/m, the occurrence of the nap is scarcely observed during the frequent use, and the prevention of sliding of the gut and the ball-catching effect are well satisfied.

On the other hand, the degree of elongation at break of the gut relates to the sound of batting the ball, the repulsion of the ball and the range of the ball batted, and relates moreover to the creep characteristic the gut itself. That is, at the elongation less than 10%, the Young's modulus is too large and it is difficult to put the gut on the racket. In addition, if one was able to put the gut to the racket, the repulsion on batting would be so large that the gut would give an extremely different and foreign impact feeling to the person who grasps the racket and deprive the player of his pleasant badminton and tennis play. On the other hand, at an elongation more than 40%, the elasticity is deficient and at the same time, the creep characteristic is degraded resulting in the bad sounding of the ball-batting, the poor repulsion of the ball and the slack of the gut. Such bad conditions made the gut not usable for the rackets.

Accordingly, the elongation at break of the gut for tennis and badminton rackets is more than 10% and less than 40%, preferably 15 to 30%.

Figure 4:
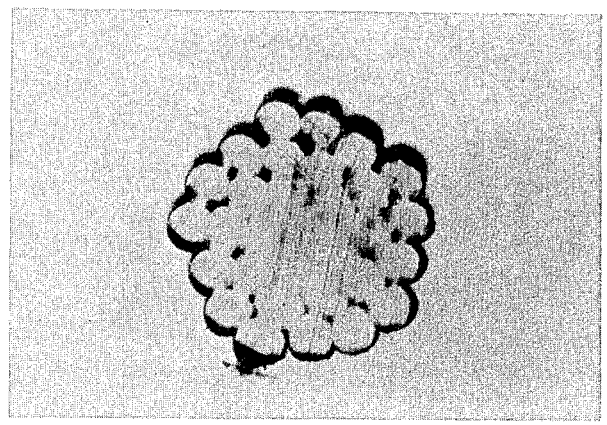
FIG. 4 is a microscopical photograph of a cross section of the gut made of polyvinylidene fluoride resin and FIG. 5 is also a microscopical photograph of the gut seen from the side.
Figure 5:

FIG. 4 shows a cross sectional view of the thus prepared gut. At its outermost periphery, jogs due to the monofilaments still remain and in the inner part, the space between the monofilaments scarsely remains due to the close coherence of the monofilaments. In the gut of the present invention, the disadvantage that the larger the diameter of monofilament of thermoplastic resin, the smaller the tensile strength of the gut is fully improved. As is seen in the side view of the gut shown in FIG. 5, since the spiral jogs due to the monofilament remain on the surface of the gut, the sliding along the length of the gut is prevented satisfactorily.

What is claimed is:

1. A method of preparing a gut comprising: melt spinning thermoplastic resin(s) selected from the group consisting of fluorocarbon resin such as polyvinylidene fluoride resin, polyamide resin and a polyester resin into a plurality of monofilaments in the number of from 5 to 100 by means of a melt spinning machine provided with a rotary spinning nozzle having 5 to 100 holes for a spinning jet and collectively twisting said plurality of monofilaments by rotating the rotary spinning nozzle while the monofilaments are maintained at a temperature at least higher than the softening point of said resin(s), thereby obtaining a gut having a structure consisting of a strong, higher density, mutually melt-adhered nuclear part and a spiral, peripheral part of melt-adhered monofilaments.

2. The method according to claim 1 in which the temperature of the center part of the bundle of monofilaments is higher than that of the outer part of the bundle of monofilaments during the twisting step.

3. The method according to claim 1 in which the rotary spinning nozzle has 20 to 60 holes.

4. The method according to claim 1 in which the thermoplastic resin is a polyvinylidene fluoride resin.

5. The method according to claim 1, 2 or 3 in which the twisting step is carried out at a temperature of 140° C. to 300° C.

6. The method according to claim 5 in which the twisting step is carried out at a temperature of 150° C. to 200° C.

* * * * *